United States Patent [19]
Ure

[11] Patent Number: 5,982,302
[45] Date of Patent: Nov. 9, 1999

[54] TOUCH-SENSITIVE KEYBOARD/MOUSE

[76] Inventor: Michael J. Ure, 3000 Sand Hill Rd., Bldg. 4, Ste. 160, Menlo Park, Calif. 94025

[21] Appl. No.: 08/207,469

[22] Filed: Mar. 7, 1994

[51] Int. Cl.$^6$ .................................................. H03M 11/00
[52] U.S. Cl. .............................. 341/22; 341/23; 341/21; 345/172; 345/173; 345/163
[58] Field of Search ................... 178/18, 19; 345/172, 345/173, 163; 341/20, 21, 22–24, 32–34

[56] References Cited

U.S. PATENT DOCUMENTS

| | | | |
|---|---|---|---|
| 3,691,555 | 9/1972 | Looschen | 340/365 |
| 4,042,777 | 8/1977 | Bequaert et al. | 179/79 |
| 4,550,221 | 9/1985 | Mabusth | 178/18 |
| 4,775,255 | 10/1988 | Langley | 400/485 |
| 4,836,700 | 6/1989 | Jensen | 400/489 |
| 5,017,030 | 5/1991 | Crews | 400/485 |
| 5,189,416 | 2/1993 | Estes | 341/26 |
| 5,194,862 | 3/1993 | Edwards | 341/20 |
| 5,231,381 | 7/1993 | Duwaer | 178/18 |
| 5,245,321 | 9/1993 | Franz et al. | 345/172 |
| 5,327,161 | 7/1994 | Logan et al. | 345/173 |
| 5,341,133 | 8/1994 | Savoy et al. | 341/21 |
| 5,376,946 | 12/1994 | Mikan | 345/173 |

OTHER PUBLICATIONS

A research center for augmenting human intellect AFIPS Fall Joint Computer Conference, 1968.
Keyboardless Sense Byte, Feb. 1992.
Twiddling at My Computer Byte, Mar. 1992.

*Primary Examiner*—Brent A. Swarthout
*Assistant Examiner*—Ashok Mannava

[57] ABSTRACT

A combination keyboard/mouse is realized using a touch-sensitive member. The touch-sensitive member (or an area of a larger touch-sensitive member) may be approximately the size of a business card (2"×3.5"). Data obtained from a touch sensor array is software manipulated to achieve a simple, powerful method of user interaction in which the traditional keyboard and mouse disappear, being replaced by a display window (manipulable like other display windows) overlaid by the touch sensor array. The resulting input window allows for realization of a sketch-pad computer having essentially no external moving parts but providing keyboard/mouse interaction (as opposed to pen-only interaction, for example). The window need not obscure underlying text and graphics but need only delineate its extent. The keyboard/mouse may instead be housed in a housing in the same manner as a conventional mouse.

14 Claims, 11 Drawing Sheets

FIG. 5: THUMB DETECTION

FIG. 4: FINGER DETECTION

| ROW | ACTIVE PIXELS |
|---|---|
| 5: | 8, 9, *, 13, 14, 15, *, 18, 19, 20, 21 |
| 6: | 7, 8, 9, 10, *, 12, 13, 14, 15, 16, *, 18, 19, 20, 21 |
| 7: | 7, 8, 9, 10, *, 13, 14, 15, 16, *, 19, 20, 23, 24, 25 |
| 8: | 7, 8, 9, 10, *, 13, 14, 15, *, 19, *, 23, 24, * 25 |
| 9: | 8, 9 |

TOUCH-SENSITIVE KEYBOARD/MOUSE

BACKGROUND OF THE INVENTION

1. Field of the Invention

The present invention relates to computer input devices and more particularly to touch-sensitive computer input devices.

2. State of the Art

Touch-sensitive electronic keyboards are known, as for example from U.S. Pat. No. 3,691,555 issued Sep. 12, 1972 to Looschen (originally assigned to Burroughs Corporation). Also known are touch-sensitive pointing devices, exemplified by U.S. Pat. No. 4,550,221 issued Oct. 29, 1985 to Mabusth. Neither class of touch-sensitive input device, however, has achieved widespread public acceptance for use with personal computers.

In the case of touch-sensitive electronic keyboards, the lack of public acceptance suggests that typists found such keyboards to be harder to use, producing more errors. Touch-sensitive electronic keyboards do not in general allow the typist to as easily find a comfortable, accustomed "home position" and to detect mishits, i.e., mistaken keystrokes.

In the case of touch-sensitive pointing devices, such devices have typically offered only low pointing resolution, contrary to the computing trend of ever-increasing resolution.

Nevertheless, touch-sensitive computer input devices continue to offer the advantages of simplicity and reliability, as well as offering the potential for significant cost savings in relation to mechanical computer input devices. Furthermore, touch-sensitive computer input devices are not subject to size constraints imposed by mechanical considerations, an important factor in an era of increasing miniaturization.

An example of a particularly advantageous touch-sensitive computer input device is found in U.S. Pat. No. 5,194,862 issued Mar. 16, 1993 to Edwards (assigned to U.S. Philips Corporation), incorporated herein by reference. The patent discloses a touch sensor array built in a similar manner as a TFT active matrix liquid crystal display and which may be used as an overlay for the same. The touch sensor array offers comparable resolution as the liquid crystal display.

SUMMARY OF THE INVENTION

The present invention, generally speaking, allows a combination keyboard/mouse to be realized using a touch-sensitive member. The touch-sensitive member (or an area of a larger touch-sensitive member) may be approximately the size of a business card (2"×3.5"). The invention provides for the software manipulation of data obtained from a touch sensor array (for example of the type set forth in the Edwards patent) to achieve a simple, powerful method of user interaction in which the traditional keyboard and mouse disappear, being replaced by a display window (manipulable like other display windows) overlaid by the touch sensor array. The resulting input window allows for realization of a sketch-pad computer having essentially no external moving parts but providing keyboard/mouse interaction (as opposed to pen-only interaction, for example). The window need not obscure underlying text and graphics but need only delineate its extent. Preferrably, the window is outlined in "marquee" fashion by blinking display pixels progressively around a perimeter of the window so as to interfere least with underlying text and graphics.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

The operational characteristics of the keyboard/mouse will first be described.

Mouse Interaction

Mice (used generically to include trackballs, trackmarbles and similar pointing devices) vary principally in their resolution and number of input buttons. Mouse software drivers typically allow for user configuration in order to adjust mouse "speed", i.e., the amount of travel of the mouse required to produce a given amount of travel of a cursor on the screen. To adjust this parameter, the user must typically go up under the control panel of a graphical user interface and make the appropriate selections.

Figure 1:
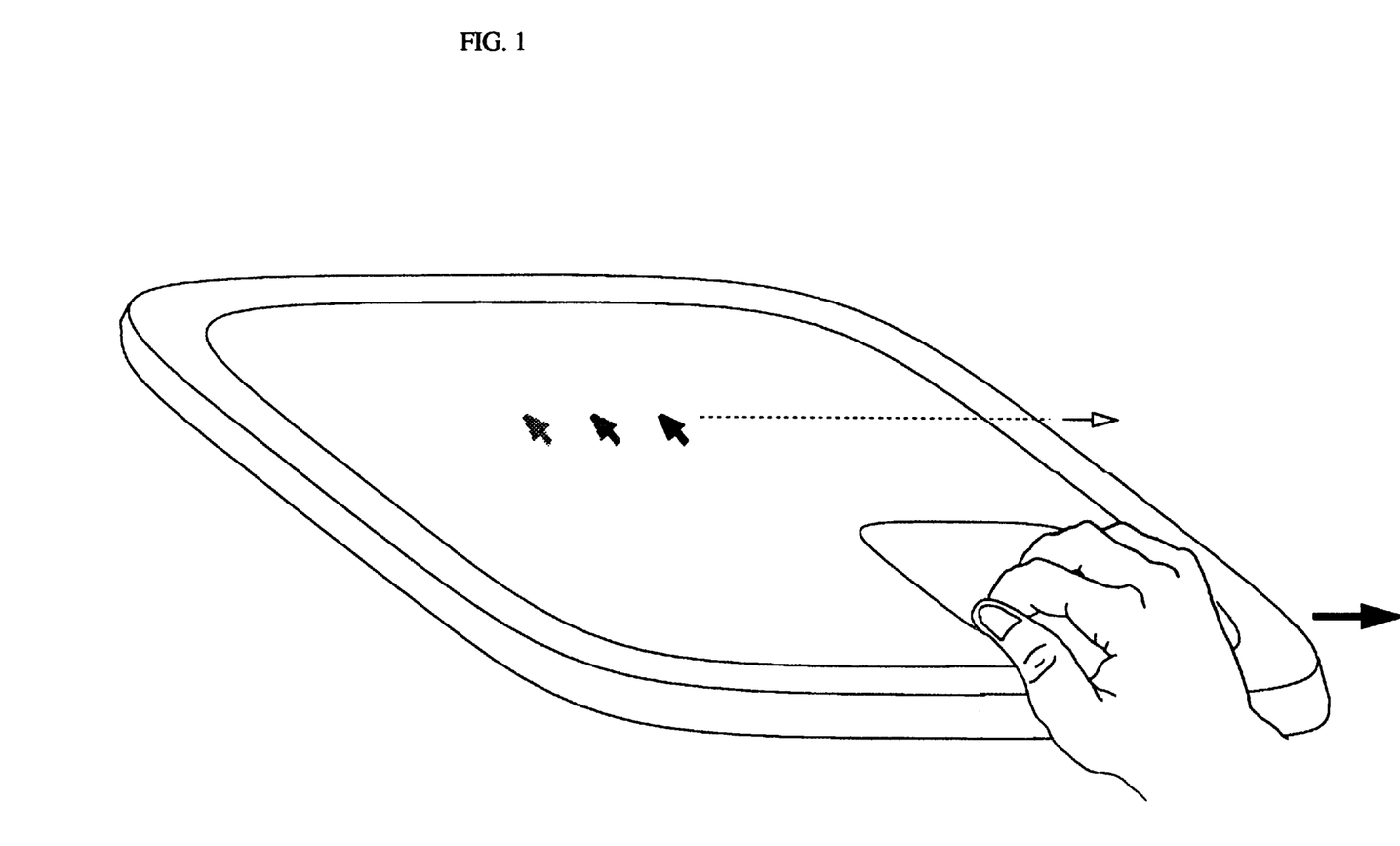
FIG. 1 is a perspective view of a sketch-pad-type computer provided with one embodiment of the keyboard/mouse, the keyboard/mouse being used in a mouse mode.

Using the present keyboard/mouse, the cursor is moved by the user moving one or more fingers across the surface of the touch-sensitive member as shown in FIG. 1. During mouse interaction, the keyboard/mouse does not concern itself with the position of the touch per se but only with movement—the change in position of touch. Hence, once the user's finger(s) has reached the edge of the touch-sensitive member or an input window defined with respect to the touch-sensitive member, the cursor may be moved farther in the same direction by retracting the finger(s) and again moving it across the member in the desired direction. Repeated, this action resembles a stroking of the touch-sensitive member.

The keyboard/mouse allows the cursor to be moved at different speeds depending on whether one, two or three fingers are moved across the member. The mouse may therefore be characterized as "three-speed" (or, if the fourth finger is used, four-speed), with shifting between speeds being easily accomplished by simply lifting or dropping one or more fingers, either while the hand is stationary, or "on-the-fly". Furthermore, the speeds may also be programmed by the user in the conventional manner. In an exemplary embodiment, the use of three fingers produces rapid, coarse movement of the cursor, the use of a single finger (typically the index finger) produces fine movement of the cursor, and the use of two fingers produces movement intermediate between the coarse and the fine.

To click, all four fingers are quickly touched to the touch-sensitive member and removed. To double-click, the same action is repeated. To drag, the thumb is first "grounded", i.e., place in stationary contact with the touch-sensitive member, effecting and sustaining a click. With the thumb grounded, one, two or three fingers may be moved to produce a dragging action in a similar manner as in normal mouse operation.

In addition to the normal (four finger) click "button", 14 additional "buttons" may be realized by different finger combinations and may be programmed through appropriate software.

Keyboard Interaction

Figure 2:
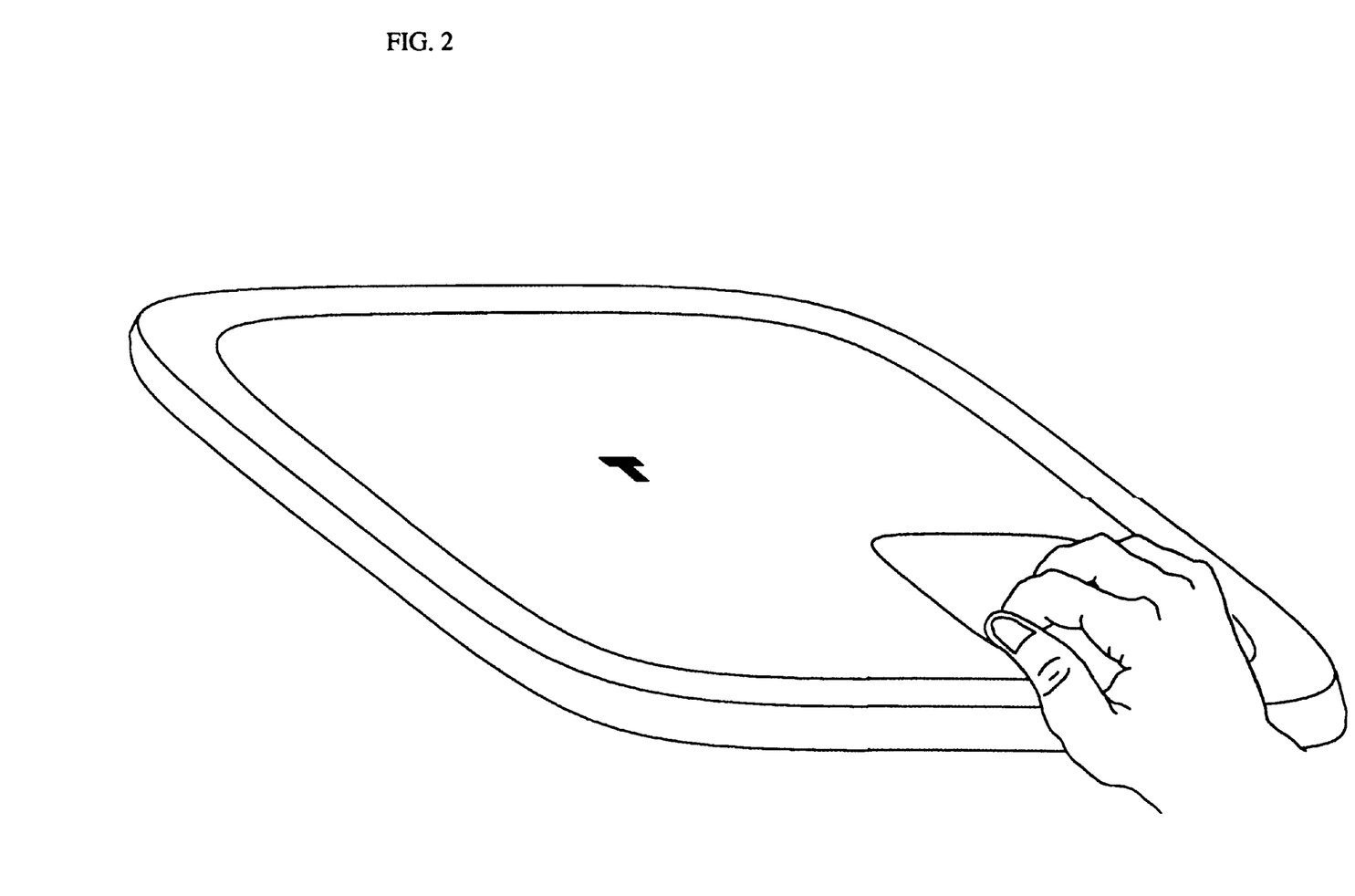
FIG. 2 is a perspective view of a sketch-pad-type computer provided with one embodiment of the keyboard/mouse, the keyboard/mouse being used in a keyboard mode.

Keyboard interaction uses "chord keying" in which various combinations of fingers are used to designate different characters as shown in FIG. 2. Different types of chord keying are described in the following references:

Proceedings AFIPS 1968, Fall Joint Computer Conference, pp. 395–410, "A Research Center for Augmenting Human Intellect", by D. C. Englebert and W. K. English;

U.S. Pat. No. 4,042,777, issued Aug. 16, 1977 and assigned to IBM; and

"Twiddling at My Computer (Handkey Corp.'s Twiddler)", Byte, March '92, p. 51.

In all of these references, keying is accomplished by the depression of mechanical keys.

In keyboard interaction with the keyboard/mouse, on the other hand, there are no keys, eliminating the difficulty of key manipulation associated with known chord keying arrangements. As compared with prior art touch-sensitive electronic keyboards, which complicated user detection of mishits, because the keyboard/mouse has no keys, there are no mishits per se. A user can, however, sense if he or she has made the wrong chord more easily than mishits could be sensed using prior art touch-sensitive keyboards.

The mapping between different chords and different characters may be programmed through appropriate software. A convenient default mapping for the letters of the alphabet, however, is set forth in Table 1 below. Letters in the first half of the alphabet are paired with letters in the second half of the alphabet for a total of 13 letter pairs. These are combined with five additional characters as later described for a total of 31 characters. The pairs may be easily recalled using mnemonics. For example the letter pairs (D,Q), (E,R) and (F,S) may be recalled by the mnemonics "Dumb Question", "Emergency Room" and "Fail Safe". The first, fifth, tenth and thirteenth letters, A, E, J and M, are reference-point letters. The ordinal numbers of the remaining letter pairs may be determined by adding 1 or 2 to the ordinal number of one of these letters or by subtracting 1 or 2. For example, the ordinal number of the letter G is that of E (5) plus 2, or 7. With a small amount of practice, such memory aids become unnecessary; however, they are important in order to coax a user away from the well-familiar QUERTY keyboard.

TABLE 1

| 1.  | A  | N  |
| --- | -- | -- |
| 2.  | B  | O  |
| 3.  | C  | P  |
| 4.  | D  | Q  |
| 5.  | E  | R  |
| 6.  | F  | S  |
| 7.  | G  | T  |
| 8.  | H  | U  |
| 9.  | I  | V  |
| 10. | J  | W  |
| 11. | K  | X  |
| 12. | L  | Y  |
| 13. | M  | Z  |
| 14. | SH | .  |
| 15. | ,  | SP |
| 16. | ASH|    |

The letter pairs and other characters are designated in hexadecimal fashion with the fourth finger corresponding to the least-significant digit and the thumb corresponding to the most-significant digit as follows:

TABLE 2

|        | FINGER(S) TOUCHING |   |   |   |   |
| ------ | --- | --- | --- | --- | --- |
| Number | T   | 1   | 2   | 3   | 4   |
| 1      |     |     |     |     | X   |
| 2      |     |     |     | X   |     |
| 3      |     |     |     | X   | X   |
| 4      |     |     | X   |     |     |
| 5      |     |     | X   |     | X   |
| 6      |     |     | X   | X   |     |
| 7      |     |     | X   | X   | X   |
| 8      |     | X   |     |     |     |
| 9      |     | X   |     |     | X   |
| 10     |     | X   |     | X   |     |
| 11     |     | X   |     | X   | X   |
| 12     |     | X   | X   |     |     |
| 13     |     | X   | X   |     | X   |
| 14     |     | X   | X   | X   |     |
| 15     |     | X   | X   | X   | X   |
| 16     | X   |     |     |     |     |

The second letter in a letter pair is designated by touching in addition the thumb, the thumb not being touched for the first letter in the pair. Lower case is the default case. For upper case, an alphabetic shift character ASH (16) is entered by touching the thumb, after which the letter is entered. Shift lock is performed by touching ASH twice is succession. Other ranges of keys, including punctuation and numerics, are available by touching a non-alphabetic shift character SH followed if necessary by a number, e.g., SH (default), SH1, SH2, etc. The most common punctuation symbols, ",", and ".", however, are part of the unshifted range as the second members of the fourteenth and fifteenth characters pairs, respectively.

The space, the most common character in English text, is designated by touching all four fingers. This motion is both facile and allows for frequent "registration" of the positions of the four fingers. Such frequent registration allows for discrimination between finger touches that might otherwise be confused, for example the forth finger alone versus the third finger alone, or the first and second fingers in combination versus the second and third fingers in combination.

The lack of visible keys, although it may present somewhat of a challenge initially, with a degree of practice actually becomes an advantage. For example, relatively few touch typists know by touch any but the most common punctuation symbols. When such a symbol is to be typed, time is spent hunting for the correct key. In the case of the present "keyless" keyboard, punctuation symbols may be designated by one or two letter abreviations, eliminating searching for a particular key. For example, the symbol "\" (backslash) may be designated as SH (non-alphabetic shift) BS. Although three strokes are required instead of just one, on average the time required for the additional strokes is saved by not having to visually search for a key.

Switching Mouse to Keyboard and Keyboard to Mouse

Keyboard interaction is always initiated by "registering", touching all four fingers and thumb to the touch-sensitive member for a moment. The input window then appears at, is moved to, or remains at the area of registration and is prepared for keyboard interaction. The input window may be moved at any time by re-registering at a different location.

Mouse interaction is always initiated by "twiddling", moving the index finger back and forth in a rapid motion. As with registering, twiddling can be used to move the input window to a different location.

Various aspects of the keyboard/mouse of the first embodiment may be adapted for different purposes. For example, it may be desirable in some instances to have the input window fixed in size and location. Furthermore, it may be desirable in certain instances to use only a mouse input window or a keyboard input window as opposed to the full-function keyboard/mouse input window.

Software Considerations

Software development tools are presently available for developing touch-screen interfaces. The software requirements of the keyboard/mouse will be some-what different from those of the conventional touch-screen interface: the keyboard/mouse requires scanning only of the area of the window itself, but processing of the window is more involved, since a touch pattern must be discriminated rather than a simple touch only.

Figure 3:
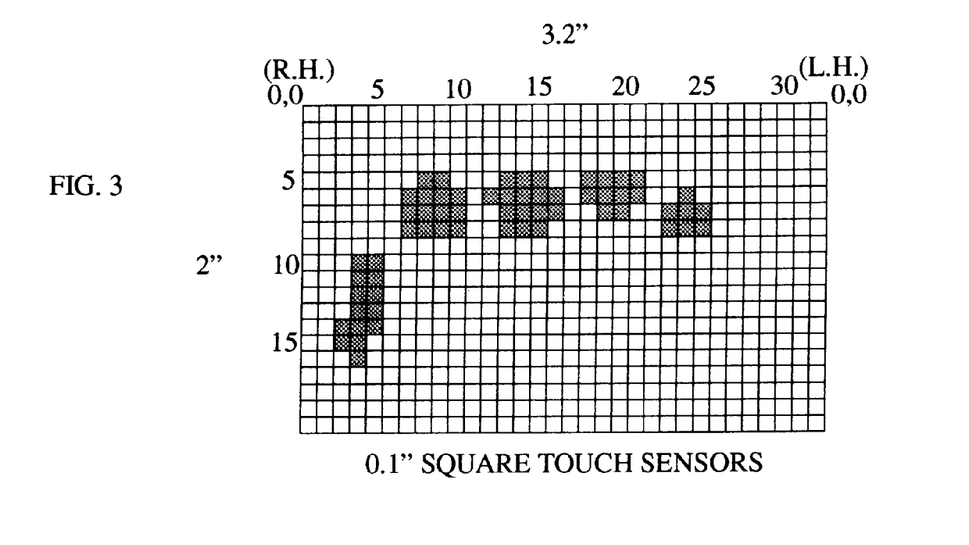
FIG. 3 is a schematic diagram of a touch sensor array having a touch pattern superimposed thereon, together with FIG. 4 is a table used for finger detection in relation to the touch pattern of FIG. 3.

The keyboard/mouse does not necessarily require a high-resolution touch-sensor array; rather, in some applications, a window of dimensions approximately 2×3.2" and 20×30 pixel resolution (approximately 0.1" square pixels) may suffice. Such a window is shown in FIG. 3 with a registration touch pattern super-imposed thereon.

The window is scanned repeatedly at a rate equal to or greater than the display refresh rate, e.g. 60 times per second. The portion of the touch sensor array scanned is determined by the current location of the input window and is automatically software controlled. To increase the accuracy of touch discrimination, the resolution of the touch-sensor array, the scanning rate of the touch-sensor array, or both, may be increased. Techniques for increasing the accuracy of touch discrimination are disclosed in U.S. Pat. No. 4,836,700 and U.S. Pat. No. 5,189,416, both of which are incorporated herein by reference.

The bit-mapped image of the scanned window may be stored, and conventional pattern-recognition techniques may be applied to the image. Such techniques are computation intensive.

Figure 4:
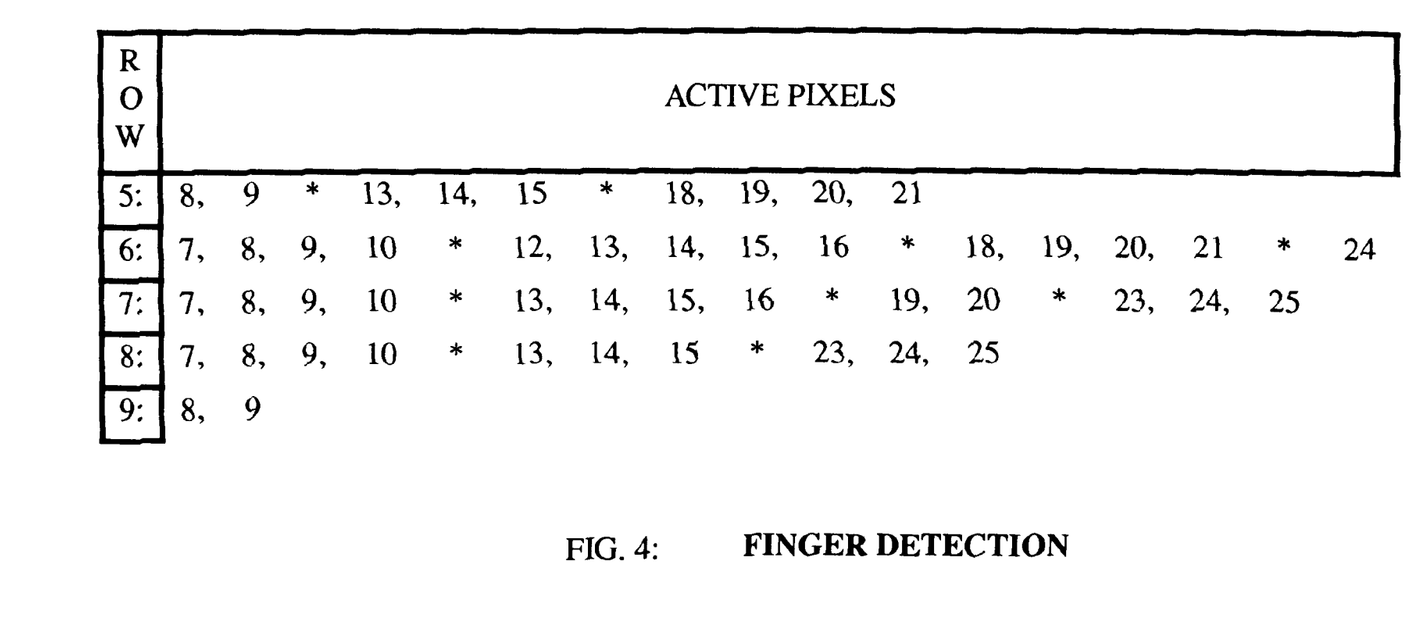

A simpler technique is to, rather than saving the whole field of the bit-mapped image, which will be mostly zeroes, saving instead only the XY counter coordinates of ones, i.e., pixels at which a touch is detected. A list may be built by row (Y coordinate) of all the columns (X coordinate) in that row at which a touch was detected. Strings of consecutive X values separated by gaps are indicative of finger touches. Not every row will have the same number of such strings as illustrated by application of the technique in FIG. 4. The greatest number of strings in any of the rows is indicative of the number of fingers touched.

During registration, X bounds are stored for each finger. These bounds are frequently updated, at each occurrence of a space in the input text. By comparing the boundaries of the X strings produced by processing of a window with the registration bounds, which fingers have been touched may be determined.

Figure 5:
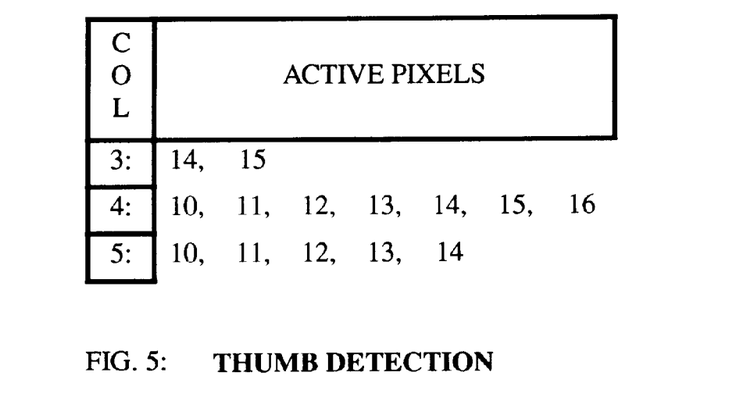
FIG. 5 is a table used for thumb detection in relation to the touch pattern of FIG. 3.

Thumb touches are detected in a slightly different manner. To detect thumb touches, a list is built by column of all the rows in that column at which a touch was detected. After initial registration, this list need only be built for the first several columns after the first column in which a touch is detected, since a thumb touch is assumed, for right-handed operation, to be the left-most touch. At initial registration, the list is built for all columns to determine whether operation is left-handed or right-handed. In left-handed operation, the direction of scanning may be reversed and the XY origin relocated from the upper left-hand corner to the upper right-hand corner. As seen in FIG. 5, a thumb touch will typically result in a Y string of length 5. That is, the thumb will typically be in contact with the touch-sensitive member in a vertical or semi-vertical direction for a length of about 5×0.1=½ inch.

Block Diagram

Figure 6:
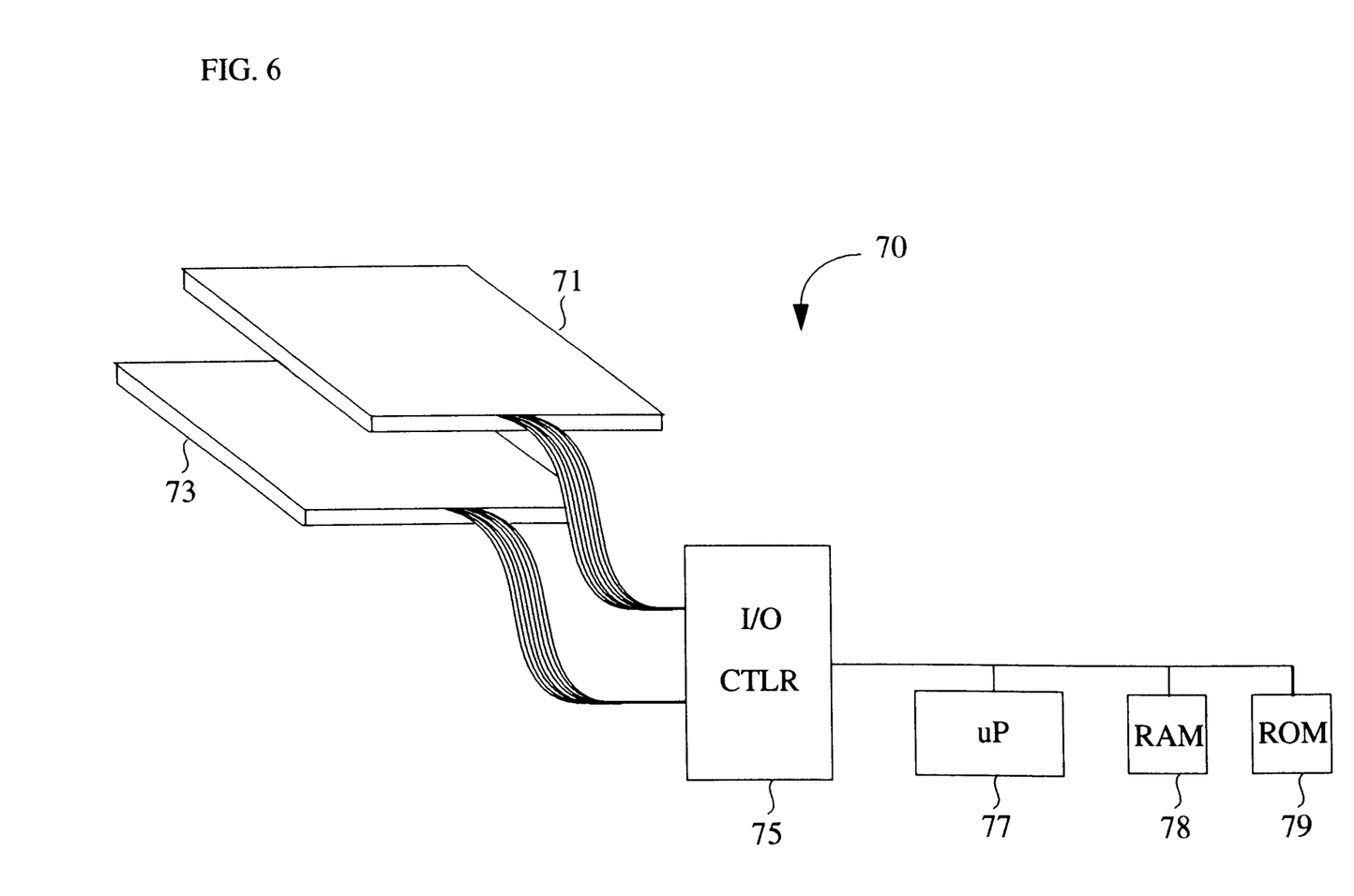
FIG. 6 is a simplified block diagram of the keyboard/mouse of the present invention.

FIG. 6 shows an exemplary hardware realization of the keyboard/mouse of the first embodiment, indicated generally by the reference numeral 70. A touch sensor array 71 overlies a display 73. The touch sensor array 71 and the display 73 are interfaced through an I/O controller 75 to a microprocessor 77. The microprocessor 77 is connected across a bus to a RAM 78 and a ROM 79.

Flowchart Description

The functional characteristics of the keyboard/mouse will now be described in conjunction with the flowcharts of FIG. 7 through FIG. 12.

Figure 7:
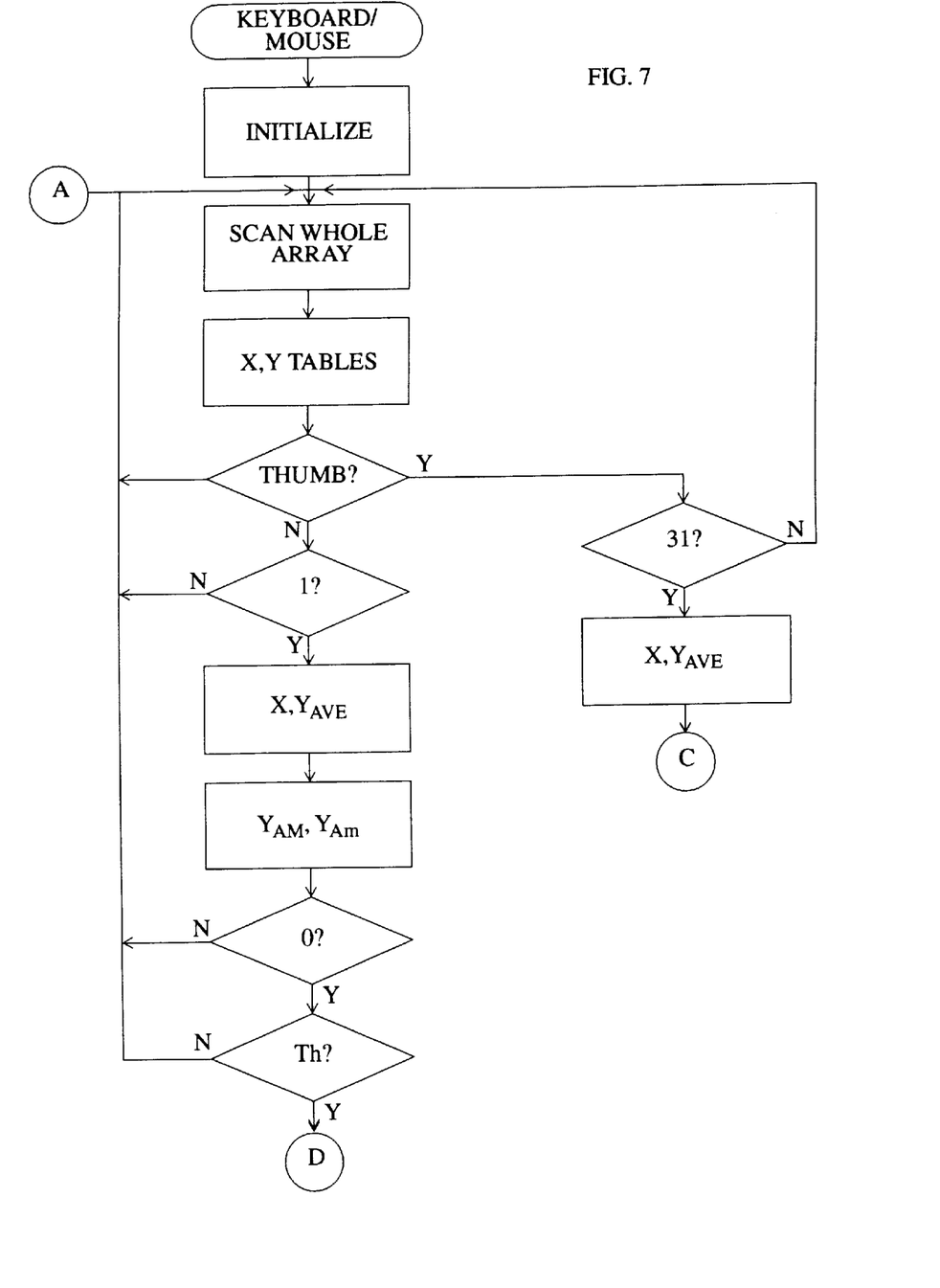
FIG. 7 is part of a flowchart illustrating operation of the keyboard/mouse in an exemplary embodiment.

Referring first to FIG. 7, upon power-up, the keyboard/mouse is initialized. It then begins scanning the whole array of the touch-sensitive member until a touch is detected. Once a touch has been detected, XY tables are built as previously described.

User operation of the keyboard/mouse must be initiated by either registration (keyboard) or a twiddle (mouse). The first task is then to detect the occurance of a registration or a twiddle. A registration is most easily distinguished from a twiddle by the touch of the user's thumb during a registration. If a thumb touch is detected, then a check is made to determine whether the touch pattern is the registration pattern (31, or all digits touching, in an exemplary embodiment). If so, then the average X and Y value of pixels touched is computed and recorded in anticipation of opening the input window in an area surrounded the area in which the registration was detected.

A twiddle is characterized by the touch of a single finger, for example the index finger, although any of the fingers may be used. A check is therefore made to determine whether the touch pattern is that of a single finger. If not, then scanning of the entire array resumes. If so, then the average X and Y value of pixels touched is computed and recorded in anticipation of opening the input window in an area surrounded the area in which the twiddle was detected. To avoid spurious detection of movement that might be mistaken as twiddles, a twiddle is required to have some minimum vertical excursion. The maximum and minimum average Y values are therefore determined continuously until the touch ceases, i.e., the touch pattern corresponds to 0. The minimum average Y value is then subtracted from the maximum average Y value and the result compared with a threshold value Th. If the threshold is equalled or exceeded then a twiddle is determined to have occurred. If not, then scanning of the entire array resumes.

Figure 8:
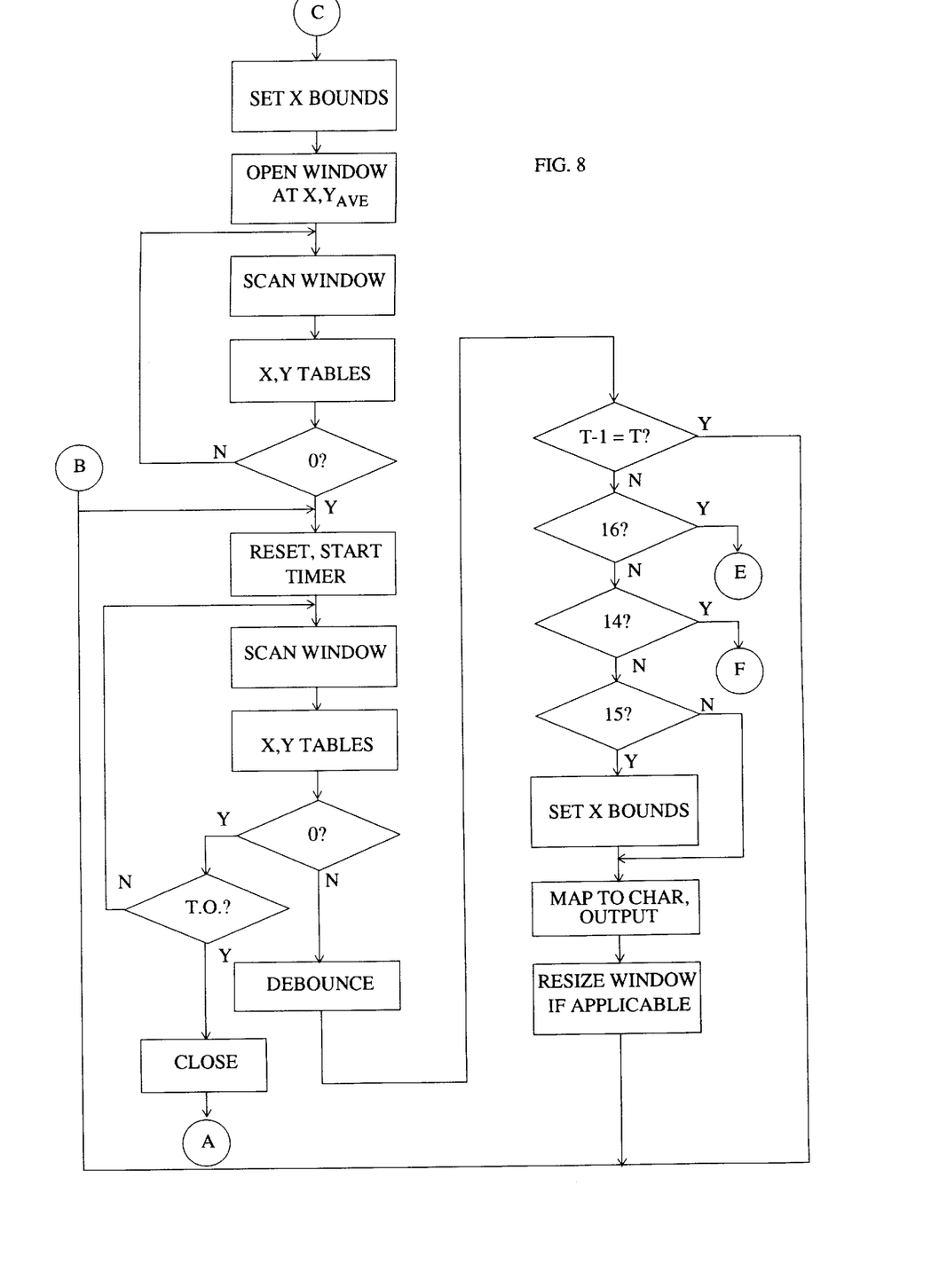
FIG. 8 is part of a flowchart illustrating operation of the keyboard/mouse in an exemplary embodiment;s part of a flowchart illustrating operation of the keyboard/mouse in an exemplary embodiment, in particular keyboard operation.

Referring to FIG. 8, if registration has occurred, keyboard mode commences by setting X bounds for each finger. An input window is then opened at $X,Y_{AVE}$. The input window is then scanned and X,Y table built. When a zero value (no touch) is detected, the registration pattern touched will have ceased, and character input may commence.

If a relatively long period of time elapses without any input, then the user may have decided to change the location of the input window, in which case the whole touch array should again be scanned. Therefore, after registration has ceased, a timer is reset and started. The input window is scanned and the X,Y tables built. So long as no touch is detected, this procedure continues until a time-out condition occurs, at which time the program flow returns to point A. When a touch is detected, a debounce procedure is performed to eliminate or reduce the effect of unintended transitions as discussed in the referenced patents. The sophistication of the debounce technique employed may vary. For example, using a high-resolution touch array and a high scanning rate, the pressures and velocities of the individual fingers may be determined in accordance with the area touched by that finger and the rate of change of that area. Rules may be developed epirically that use this information to eliminate undesired transistions.

A simple way to avoid the problem of undesired transitions is to require every transition to pass through an unambiguous "transition state." In the present instance, a "return-to-zero" technique may be used in which valid touches must be separated by zeros, i.e., the absense of touch. Such a requirement slows input, however, and is not preferred.

Nevertheless, in the preferred embodiment, repetitions of characters are required to be separated by zeros. In other words, the duration of the touch is not considered, altough in other embodiments it might be. Therefore, following the debounce procedure, a determination is made whether the detected touch pattern is unchanged from before. If so, scanning recommences.

If the touch pattern has changed, a series of checks is made for special input characters, including control characters. If the touch pattern is 16, designating an alphabetic shift, program flow continues at point E (Figure). If the touch pattern is 14, designating an non-alphabetic shift, program flow continues at point F (Figure).

If the touch pattern is 15 (space), then re-registration occurs, and new X bounds are set for the fingers. Following re-registration, or if the touch pattern is none of the above, the touch pattern is mapped to a corresponding character and input to the host device. The input window is then resized, if applicable.

Figure 9:
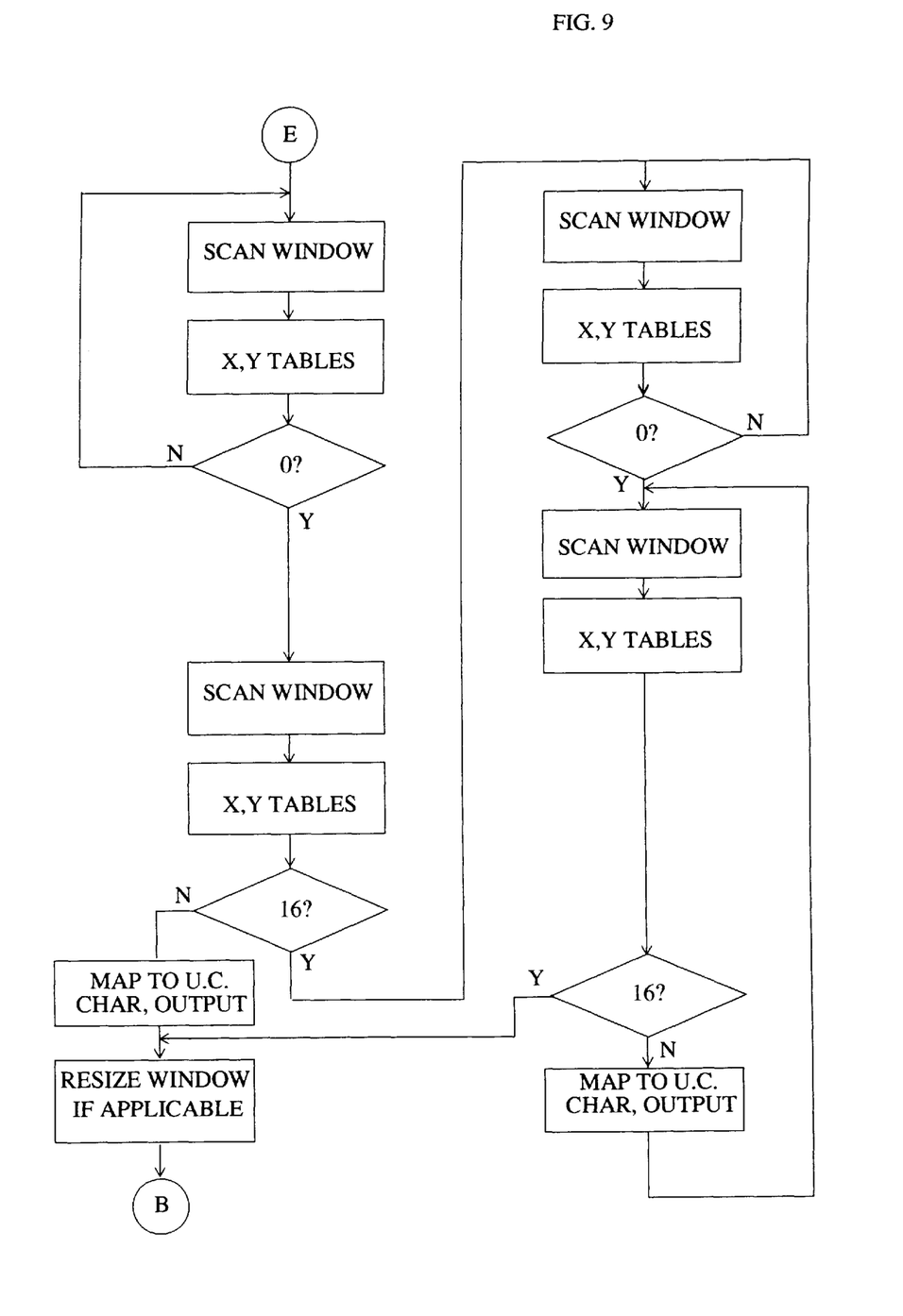
FIG. 9 is part of a flowchart illustrating operation of the keyboard/mouse in an exemplary embodiment, in particular an alphabetic shift feature used during keyboard operation.

Referring to FIG. 9, if the input character was 16, alphabetic shift, the program waits until a zero (absence of touch) is detected. The alphabetic shift pattern is required to be followed with a zero. The input window is then scanned for a subsequent touch pattern. If that touch pattern is something other than 16 (the alphabetic shift pattern, repeated), then the touch pattern is mapped to the corresponding upper case character, the window is resized if applicable, and program flow returns to point B.

If the touch pattern is again 16 (the alphabetic shift pattern), then a shift-lock condition is indicated. Again, the program waits unit a zero (absence of touch) is detected.The input window is then scanned for a subsequent touch pattern. If that touch pattern is something other than 16 (the alphabetic shift pattern), then the touch pattern is mapped to the corresponding upper case character and the window is scanned for a touch pattern corresponding to a subsequent upper case character. Once the alphabetic shift pattern is again detected, it signal the end of the shift-lock condition, and program flow returns to point B (following resizing of the window, if necessary).

Figure 10:
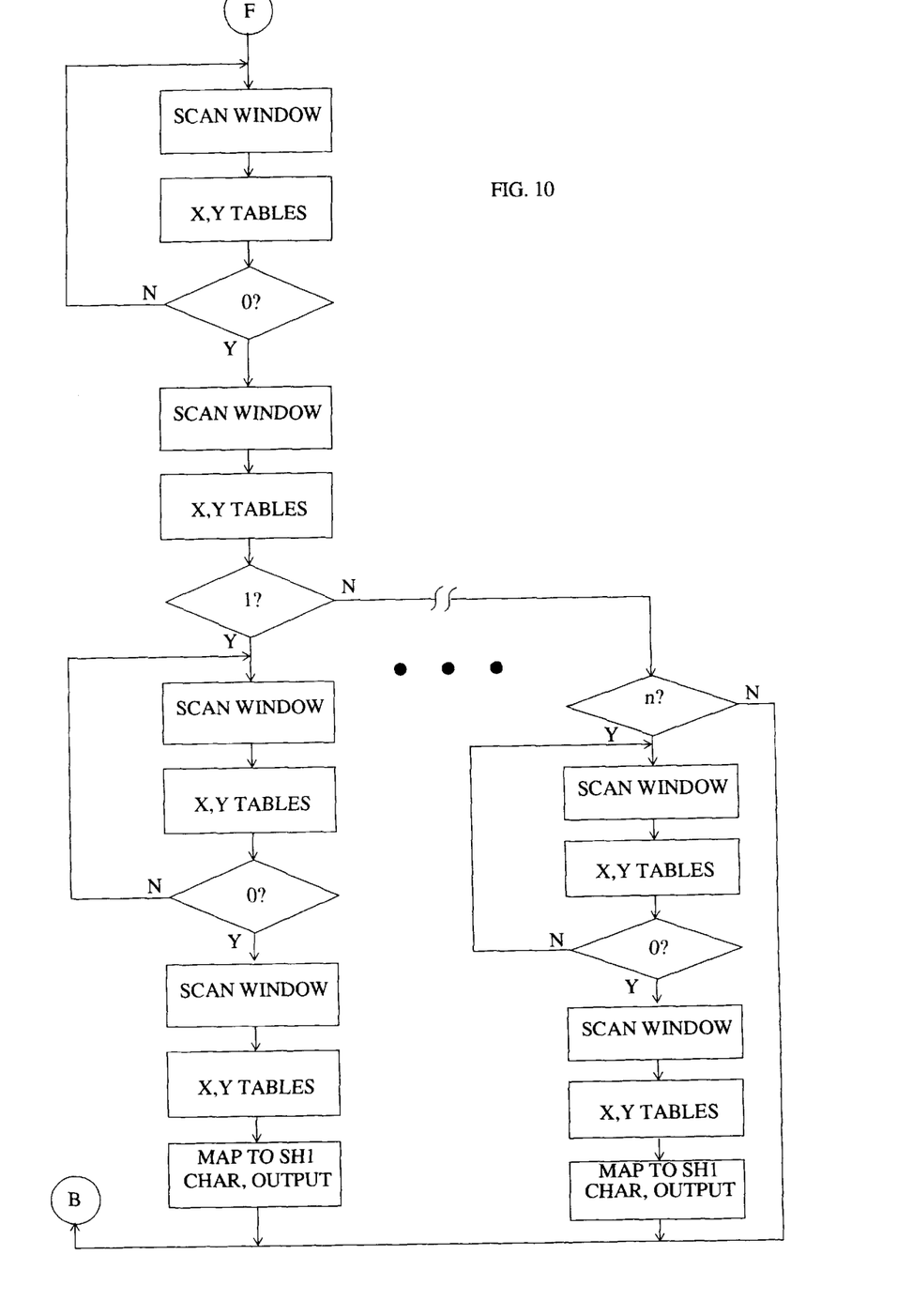
FIG. 10 is part of a flowchart illustrating operation of the keyboard/mouse in an exemplary embodiment, in particular a non-alphabetic shift feature used during keyboard operation.

Referring to FIG. 10, if the input character was 14, non-alphabetic shift, the program waits until a zero (absence of touch) is detected. The non-alphabetic shift pattern is required to be followed with a zero. The input window is then scanned for a subsequent touch pattern. That touch pattern may correspond to 1, 2, 3, or any other designator of a shifted character range from among some number n of shifted character ranges. The program once again waits until a zero (absence of touch) is detected.The input window is then scanned for a subsequent touch pattern. Then the touch pattern is mapped to the corresponding shifted character, and program flow returns to point B.

Figure 11:
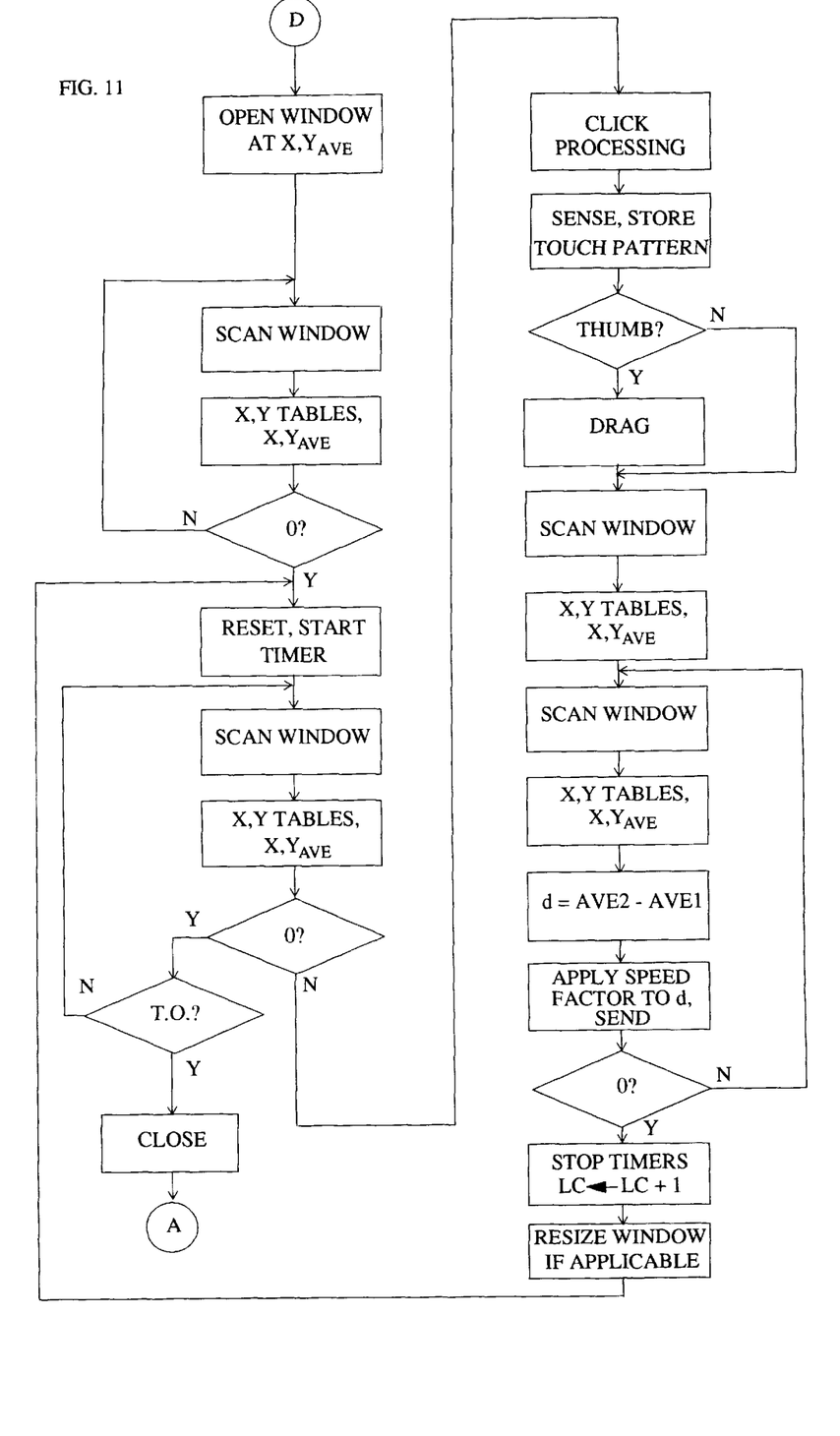
FIG. 11 is part of a flowchart illustrating operation of the keyboard/mouse in an exemplary embodiment, in particular mouse operation.

Referring to FIG. 11, if a twiddle has occurred, mouse mode commences by opening an input window at $X,Y_{AVE}$. The input window is then scanned and X,Y tables built. The average X and Y values are calculated. When a zero value (no touch) is detected, the twiddle will have ceased, and mouse operation may commence. If a relatively long period of time elapses without any input, then the user may have decided to change the location of the input window, in which case the whole touch array should again be scanned. Therefore, after the twiddle has ceased, a timer is reset and started. The input window is scanned and the X,Y tables built. So long as no touch is detected, this procedure continues until a time-out condition occurs, at which time the input window is closed and the program flow returns to point A.

When a touch is detected, click processing is performed in accordance with Figure, later described. Following click processing, the touch pattern is sensed and stored. The touch pattern determined mouse speed and determines the identity of a button clicked or double-clicked as previously described.

If the thumb is touched, then a drag operation is indicated. Otherwise, ordinary cursor movement is performed. The input window is scanned repeatedly, each time building the XY tables and computing the average X and Y values. The average values from the two most recent scans are stored, and the most recent value is subtracted from the next-most-recent value to produce a difference value, d. Depending on the touch pattern, a speed factor is applied to d, and the result is sent to the host device. Operation continues in this manner for so long as a touch continues. When a zero (absence of touch) is detected, timers used in click processing or stopped, and a modulo 2 loop counter LC, also used in click processing, is incremented. The input window is resized, if applicable, and the described operation is repeated, beginning with the step RESET, START TIMER.

A click is distinguished by a touch of specified brief duration ocurring after an absence of touch (and before a following absence of touch). A double click is distinguished as two successive clicks. (Triple clicks may of course also be detected if desired.) During loop iterations in Figure, two counters alternately count the time elapsed between the detection of a touch and the subsequent detection of the absence of touch.

Figure 12:
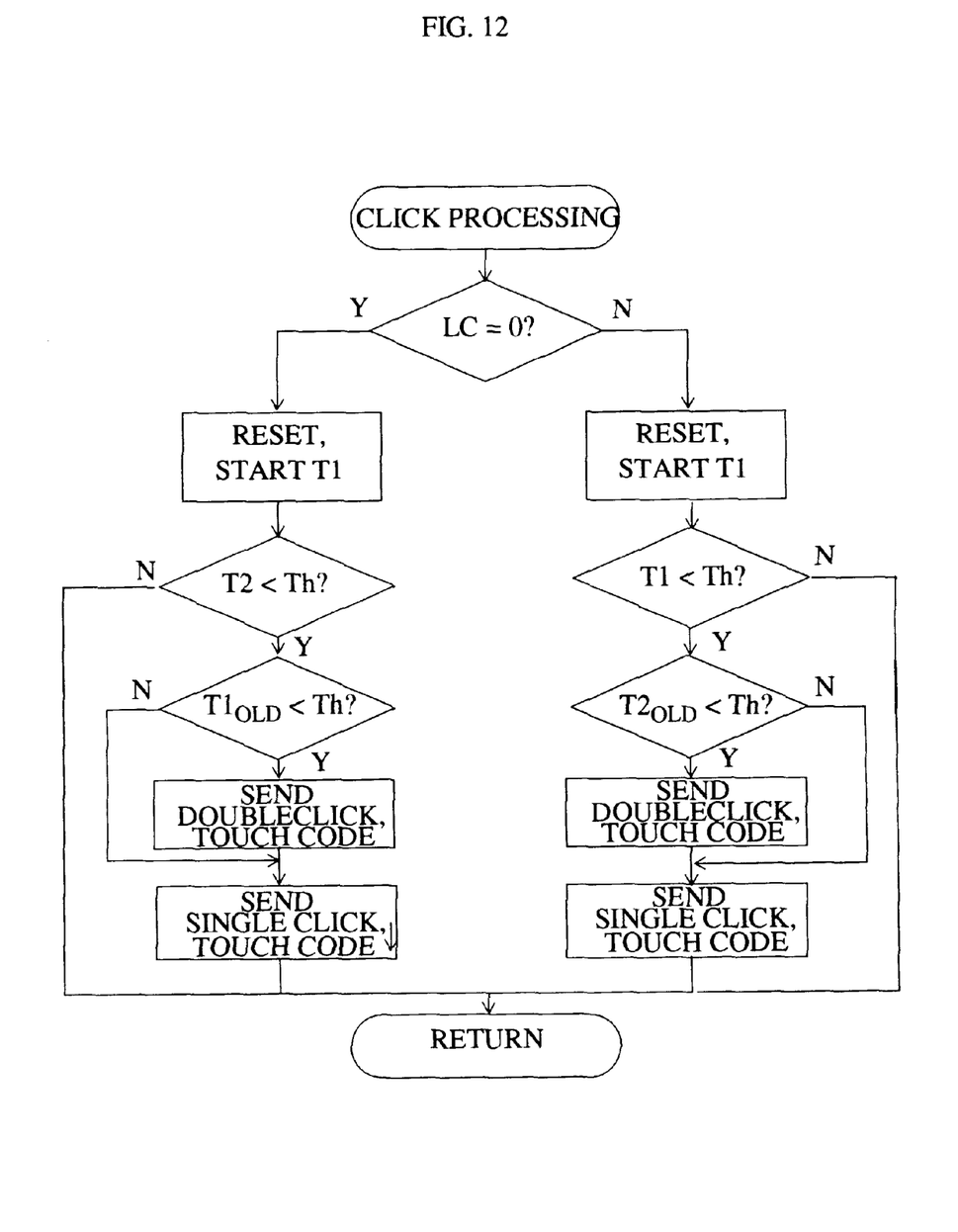
FIG. 12 is part of a flowchart illustrating operation of the keyboard/mouse in an exemplary embodiment, in particular click processing performed during mouse operation.

Referring to FIG. 12, at the outset of click processing, the loop counter is check to see which timer's turn it is to time touch duration. In the illustrated embodiment, if the loop counter is zero, a first timer T1 times the duration of the touch. If the loop counter is not zero, a second counter T2 is used. The timer whose turn it is to count (for example, T1) is reset and started after first storing its previous count. If the last active counter (for example, T2) counted a duration greater than the upper threshold duration for a click, then click processing concludes. If the last active counter (T2) counted a duration less than the upper threshold duration for a click, then at least a single click has been detected and possibly a double click. Click processing continues by checking to see whether the previous count of the counter just started was also less than the threshold duration. If so, then a double click is sent to the host along with the touch code indicating which button was double clicked. If not, then a single click is sent to the host along with the touch code indicating which button was clicked. During the next iteration, it may happen that the single click sent previously turns out to have been in actuality a double click in progress. In the illustrated embodiment, the host operating system is assumed to be tolerant of such an occurrence.

"Etch-a-Sketch" Computing

The keyboard/mouse provides an alternative to pen-only input for sketch-pad type computers. With a minimum of practice, input speed using the keyboard/mouse will exceed the speed of pen input. Furthermore, until handwriting recognition software improves, the accuracy obtainable using the keyboard/mouse will greatly exceed that of pen input. The familiarity of keyboard-and-mouse interaction is preserved. In at least one respect, that interaction is greatly improved, in that switching from keyboard to mouse and vice versa may be accomplished with a simple finger stroke. In terms of size, cost and reliability, the keyboard/mouse is to be greatly preferred over the conventional keyboard-and-mouse combination. As the potential for integrating motherboard electronics onto the same substrate as a display screen is gradually realized, personal computers may be expected to comprise primarily a housing and a display screen unit including integrated electronics and an integrated input device of the type described. In accordance other embodiments of the invention, the keyboard/mouse may be a distinct device separate from the display screen or separate from the computer. In such embodiments, the key-board/mouse may be housed in a housing in the same manner as a conventional mouse. Communications between the keyboard/mouse and a host computer may be wired or wireless.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. Using an input device having a touch-sensitive stationary member, a method of interacting with a computer having a display and displaying an icon, the method comprising the step of:

moving a fingertip across said member while a user's thumb is applied to said member; and sensing said fingertip and said thumb by means of said touch-sensitive stationary member in order to drag said icon across said display.

2. Using an input device having a touch-sensitive stationary member, a method of interacting with a computer having a display and displaying a cursor, the method comprising the steps of:

moving a fingertip across said member in order to cause said cursor to moved across said display; and varying a distance said cursor is moved across said display in response to a distance said fingertip is moved across said member in accordance with whether one or more than one fingertip is moved across said member.

3. A method of inputting characters into a computer using a touch-sensitive member, comprising:

touching different numbers of fingers to the touch-sensitive member to represent different characters;

sensing a number of fingers touched to the touch-sensitive member; and responsive to said sensing, producing a binary representation of respective ones of said different characters.

4. A method of inputting characters into a computer using a touch-sensitive member, comprising:

touching different combinations of fingers to the touch-sensitive member to represent different characters;

sensing a combination of fingers touched to the touch-sensitive member; and responsive to said sensing, producing a binary representation of respective ones of said different characters.

5. The method of claim 4, comprising the further steps of:

at a first time, touching a predetermined combination of fingers to the touch-sensitive member;

sensing and storing positions of said predetermined combination of fingers touched to the touch-sensitive member; and using said positions for determining, from among different possible combinations of fingers, a combination of fingers touched to the touch-sensitive member at a second time.

6. The method of claim 5, comprising the further step of:

producing a binary representation of a space in response to said predetermined combination of fingers.

7. A method of inputting characters into a computer using a touch-sensitive member, comprising:

touching different numbers and combinations of fingers to the touch-sensitive member to represent different characters;

sensing a number and a combination of fingers touched to the touch-sensitive member; and responsive to said sensing, producing a binary representation of respective ones of said different characters.

8. A touch-sensitive apparatus for inputting characters into a computer, comprising:

a touch-sensitive member;

means for sensing a number of fingers touched to the touch-sensitive member; and means, responsive to said sensing, for producing a binary representation of respective ones of said characters.

9. A touch-sensitive apparatus for inputting characters into a computer, comprising:

a touch-sensitive member;

means for sensing a combination of fingers touched to the touch-sensitive member; and means, responsive to said sensing, for producing a binary representation of respective ones of said characters.

10. The apparatus of claim 9, further comprising:

means for sensing and storing positions of a predetermined combination of fingers touched to the touch-sensitive member at a first time; and means for using said positions for determining, from among different possible combinations of fingers, a combination of fingers touched to the touch-sensitive member at a second time.

11. A touch-sensitive apparatus for inputting characters into a computer, comprising:

a touch-sensitive member;

means for sensing a number and a combination of fingers touched to the touch-sensitive member; and means, responsive to said sensing, for producing a binary representation of respective ones of said characters.

12. A computer input device for inputting characters into a computer, comprising:

touch-responsive means for producing a signal in response to movement of a user's fingertips, said touch-responsive means being void of visual indications indicating distinct keys; and means responsive to said signal for producing a binary representation of respective ones of said characters.

13. A computer input device, comprising:

a touch-sensitive member;

means coupled to said touch-sensitive member and operative in a first mode of operation for producing a position-related signal responsive to movement of a user's fingertip across the member;

means coupled to said touch-sensitive member and operative in a second mode of operation for sensing at least one of 1) a number of fingers touched to the touch-sensitive member, and 2) a combination of fingers touched to the touch-sensitive member; and means, responsive to said sensing and operative in said second mode of operation, for producing a binary representation of an input character.

14. A computer input method using a touch-sensitive member, comprising the steps of:

in a first mode of operation, producing a position-related signal responsive to movement of a user's fingertip across the member;

in a second mode of operation, sensing at least one of 1) a number of fingers touched to the touch-sensitive member, and 2) a combination of fingers touched to the touch-sensitive member; and in said second mode of operation, producing a binary representation of an input character responsive to said sensing.

* * * * *